United States Patent
Takahashi et al.

(10) Patent No.: US 7,936,905 B2
(45) Date of Patent: May 3, 2011

(54) METHOD, SYSTEM AND PROGRAM FOR AUTHENTICATING A USER BY BIOMETRIC INFORMATION

(75) Inventors: Kenta Takahashi, Kawasaki (JP); Shinji Hirata, Machida (JP); Hideitsu Hino, Kawasaki (JP); Masahiro Mimura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 960 days.

(21) Appl. No.: 11/691,575

(22) Filed: Mar. 27, 2007

(65) Prior Publication Data

US 2008/0037833 A1    Feb. 14, 2008

(30) Foreign Application Priority Data

Mar. 29, 2006   (JP) ................................ 2006-091807
Jan. 5, 2007    (JP) ................................ 2007-000671

(51) Int. Cl.
*G06K 9/00* (2006.01)
(52) U.S. Cl. ...................................... 382/115; 382/124
(58) Field of Classification Search .................. 382/115, 382/124
See application file for complete search history.

(56) References Cited

U.S. PATENT DOCUMENTS

| | | | |
|---|---|---|---|
| 5,680,460 A * | 10/1997 | Tomko et al. ................. | 713/186 |
| 6,219,794 B1 * | 4/2001 | Soutar et al. ................... | 726/18 |
| 6,744,909 B1 * | 6/2004 | Kostrzewski et al. ........ | 382/115 |
| 7,317,814 B2 * | 1/2008 | Kostrzewski et al. ........ | 382/115 |
| 7,483,569 B2 * | 1/2009 | Bhagavatula et al. ........ | 382/181 |
| 7,689,006 B2 * | 3/2010 | Govindaraju et al. ........ | 382/115 |
| 2002/0150283 A1 | 10/2002 | Mimura et al. | |
| 2005/0018925 A1 * | 1/2005 | Bhagavatula et al. ........ | 382/278 |
| 2005/0229009 A1 | 10/2005 | Fujii et al. | |
| 2007/0226512 A1 * | 9/2007 | Kevenaar et al. ............. | 713/186 |
| 2007/0237366 A1 * | 10/2007 | Maletsky ....................... | 382/115 |
| 2010/0119126 A1 * | 5/2010 | Rane et al. .................... | 382/125 |
| 2010/0153738 A1 * | 6/2010 | Jonas ............................. | 713/186 |

FOREIGN PATENT DOCUMENTS

| | | |
|---|---|---|
| JP | 2001-007802 | 1/2001 |
| JP | 2004-178606 | 6/2004 |

OTHER PUBLICATIONS

Marios Savvides, et al.; Authentication-Invariant Cancellable Biometric Filters for Illumination-Tolerant Face Verification; Biometric Technology for Human Identification; Proceedings of SPIE vol. 5404; (SPIE, Bellingham, WA 2004); p. 156-163.

Naoto Miura, et al.; Feature extraction of finger-vein patterns based on repeated line tracking and its application to personal identification; Machine Vision and Applications (Jul. 21, 2004) 15: p. 194-203.

\* cited by examiner

*Primary Examiner* — Aaron W Carter
*Assistant Examiner* — Utpal Shah
(74) *Attorney, Agent, or Firm* — Antonelli, Terry, Stout & Kraus, LLP.

(57) ABSTRACT

A personal authentication method is provided for authenticating a user by cross-relation between an enrolled image and a verification image of biometric information of the user. Upon registration of the biometric information, the method generates a filter for scrambling the image and an inverse filter thereof, and applies the filter to the enrolled image generated from the biometric information to generate a registration template which is then stored to a memory. Upon authentication of the user, the method applies the inverse filter to the verification image generated from the biometric information collected from the user, and then verifies the identity of the user based on cross-relation between the verification image after application of the inverse filter and the registration template.

28 Claims, 12 Drawing Sheets

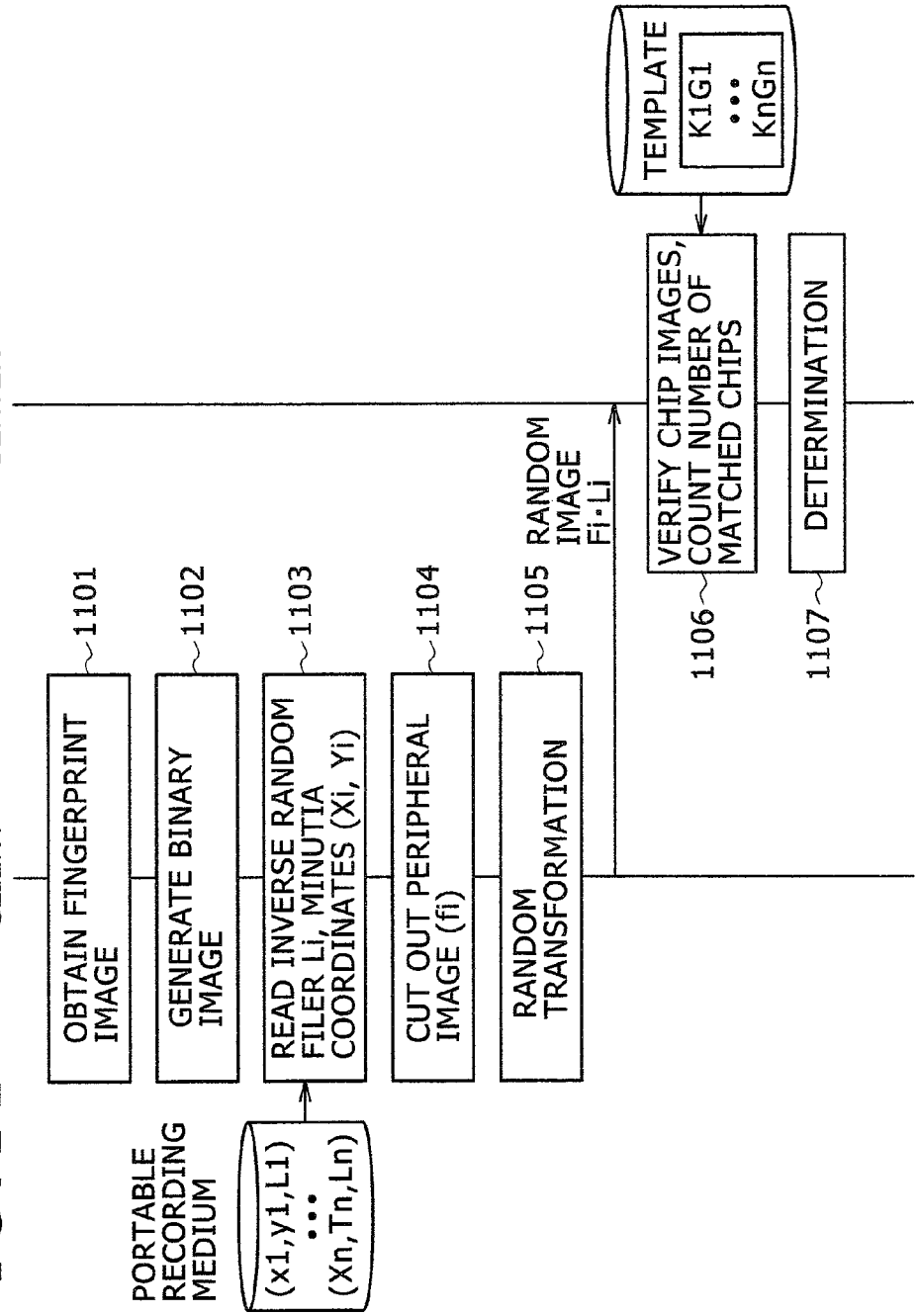

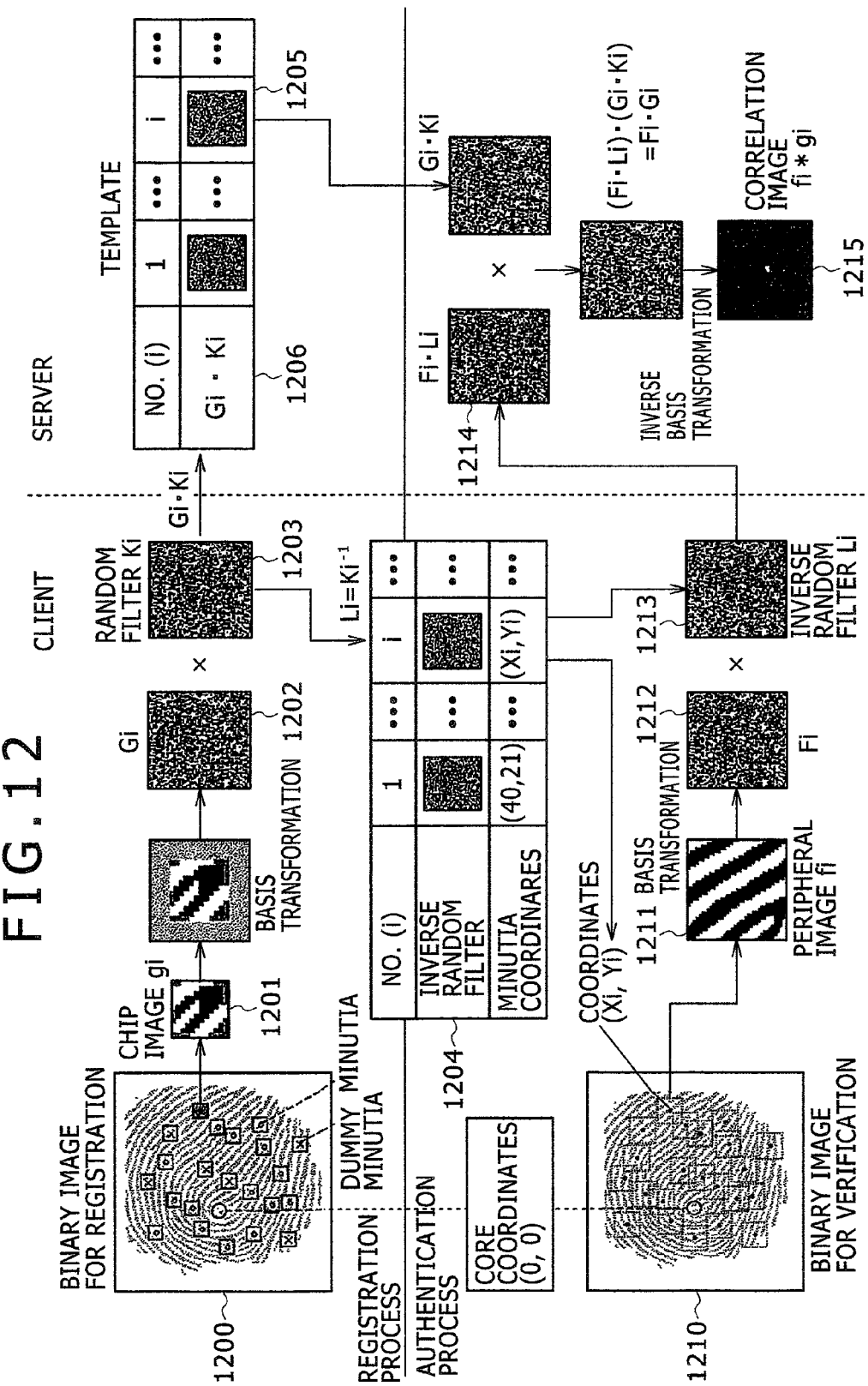

METHOD, SYSTEM AND PROGRAM FOR AUTHENTICATING A USER BY BIOMETRIC INFORMATION

CLAIM OF PRIORITY

The present application claims priority from Japanese application serial No. 091807/2006 filed on Mar. 29, 2006 and Japanese application serial No. 000671/2007 filed on Jan. 5, 2007, the contents of which are hereby incorporated by reference into this application.

BACKGROUND OF THE INVENTION

The present invention relates to a biometric authentication method and system for authenticating a user by biometric information of the user.

A personal authentication system using biometric information obtains biometric information of a user in the initial registration, extracts information called a feature quantity, and registers the extracted information. This registered information is called a template. Upon authentication, the system obtains again the biometric information from the user to extract the feature quantity, and verifies the identity of the user by verifying the feature quantity against the template having been registered.

In a system in which a client and a server are connected via a network, typically the server maintains a template when biometrically authenticating a user on the client side. The client obtains the biometric information of the user upon authentication, extracts a feature quantity, and transmits to the server. The server matches the feature quantity against the template to determine whether the two feature quantities are from the same person.

However, the template is information by which an individual can be identified. Thus the template needs to be strictly managed as personal information and thereby needs a high management cost. Even if the information is strictly managed, many people are still psychologically hesitant to register a template from the point of view of privacy. The number of physical characteristics per person for one pieces of biometric information (e.g., only ten fingers for fingerprints) is limited, so that the template is not easily changed, unlike the password and encryption key. Thus the biometric authentication could not be used if the template were leaked and exposed to forgery. In addition, when the same biometric information is registered to a different system, the different system also faces a threat.

To cope with the above described problems, JP-A No. 7802/2001 (US 20050229009, EP 1063812) discloses a method that biometric information is encrypted and transmitted to an authentication server. With this method, as the biometric information is needed to be encrypted upon authentication, it is difficult to prevent leakage caused by sophisticated attacks as well as leakage intentionally caused by a server administrator. Hence the method is insufficient for the protection of privacy issues.

Thus a method (called cancelable biometric authentication) is proposed in which, upon registration of biometric information, a feature quantity is transformed by a certain function and secret parameter held by the client and is stored as a template to the server to which the original information is kept confidential, and upon authentication, a feature quantity of biometric information is newly extracted by the client, transformed by the same function and parameter, and is transmitted to the server which then matches the received feature quantity against the template in the transformed state respectively.

With this method, as the client secretly holds the transformation parameter, the original feature quantity is still unknown to the server upon authentication and the personal privacy is protected. Even if the template is leaked, security can be maintained by regenerating and reregistering the template with the transformation parameter changed. In the case of using the same biometric information to different systems, templates are registered after transformation of different parameters for the respective systems. In this way, even if one template is leaked, it is possible to prevent the security of the other systems from being reduced.

A specific method for realizing cancelable biometric authentication is dependant on the type and verification algorithm of the biometric information. A method for realizing cancelable biometric authentication by face images is proposed in M. Savvides, B. V. K. Vijayakumar, and P. K. Khosla, "Authentication-Invariant Cancelable Biometric Filters for Illumination-Tolerant Face Verification", Biometric Technology for Human Identification, Proceedings of SPIE Vol. 5404, p156-163. In this method, a face image is transformed into frequency space. Upon registration, a filter is generated as a template for absorbing illumination changes and the like. Upon authentication, a filter process is applied using the template to the input face image. Then the authentication is performed by making a threshold determination for the output pattern.

According to the above JP-A No. 7802/2001 (US 20050229009, EP 1063812), in a remote user authentication system using biometric information, the input biometric information is encrypted on the client side and is transmitted to the authentication server in which the encrypted information is decoded. This makes it possible to securely transmit and receive the biometric information in the biometric authentication system via a network. However, the user's biometric information may not be confidential to a server administrator as the biometric information is decoded within the authentication server. For this reason, there is a possibility of leakage of unencrypted biometric information due to an accident or dishonesty of the server administrator. Still there remains a problem that the hesitation about privacy for the user may not be reduced.

According to the description in M. Savvides, B. V. K. Vijayakumar, and P. K. Khosla, "Authentication-Invariant Cancelable Biometric Filters for Illumination-Tolerant Face Verification", Biometric Technology for Human Identification, Proceedings of SPIE Vol. 5404, p156-163, it is possible to realize cancelable transformation by applying a random filter to a registration template. However, when the cancelable transformation is performed by applying such a method to a verification algorithm using cross-correlations between images as verification values, the verification values are largely different, thereby causing a problem that the verification accuracy is degraded.

Further, when the enrolled image and the verification image are three-value images having three types of illuminance values according to the degree of physical characteristics, a verification algorithm uses distance values of the three-value images as verification values. Also in this case, the cancelable transformation may not be realized by the method proposed in M. Savvides, B. V. K. Vijayakumar, and P. K. Khosla, "Authentication-Invariant Cancelable Biometric Filters for Illumination-Tolerant Face Verification", Biometric Technology for Human Identification, Proceedings of SPIE Vol. 5404, p156-163.

SUMMARY OF THE INVENTION

The present invention provides a biometric authentication for realizing cancelable transformation to a verification algorithm having predetermined characteristics, without degrading the verification accuracy.

The present invention is a method for authenticating a user based on cross-correlation between an enrolled image and a verification image of biometric information of a user. Upon registration, the method generates a filter for scrambling the image and an inverse filter thereof, generates a registration template by applying the filter to the enrolled image generated from a biometric image, and stores the registration template into a memory. Upon authentication, the method applies the inverse filter to the verification image generated from biometric information obtained from the user, and verifies the identity of the user by the cross-correlation between the verification image after application of the inverse filter and the registration template.

Further a biometric authentication system according to the present invention is preferably a system for biometrically authenticating a user. The biometric authentication system includes: an image generation unit that generates an image for registration or verification from collected biometric information of the user; a filter generation unit that generates a filter and inverse filter for scrambling the image; a transformation unit that generates a registration template by applying the filter generated in the filter generation unit to the image generated in the image generation unit, or generates a verification image by applying the inverse filter to the image; a registration unit that stores the registration template to a memory; and a verification unit that matches the verification image obtained upon authentication against the registration template stored in the memory, to determine cross-correlation therebetween. With such a configuration, the system authenticates the user identity according to a determination result of the verification unit.

According to a preferred example, a biometric authentication system according to the present invention is a system for biometrically authenticating a user by terminal equipment and a server, which are connected via a network. The terminal equipment includes: an image generation unit that generates an image for registration or verification from collected biometric information of the user; a filter generation unit that generates a filter and inverse filter for scrambling the image; a transformation unit that generates a registration template by applying the filter generated in the filter generation unit to the image generated in the image generation unit, or generates a verification image by applying the inverse filter to the image; and a first communication unit that transmits information including at least the registration template or the verification image, to the server. The server includes: a second communication unit that receives information transmitted from the terminal equipment; a registration unit that stores the registration template received via the second communication unit into a memory; and a verification unit that matches the verification image obtained via the communication unit upon authentication against the registration template stored in the memory, and determines cross-correlation therebetween. With such a configuration, the system biometrically authenticates the user identity according to a determination result of the verification unit.

Further the present invention preferably is a biometric device used by being connected to other equipment for biometrically authenticating a user based on cross-correlation between an enrolled image and a verification image of the user's biometric information. The biometric device includes: a sensor that collects biometric information of a user; an image generation unit that generates an image for registration or verification from the collected biometric information of the user; a filter generation unit that generates a filter for scrambling the image and an inverse filter thereof; and a transformation unit that generates a registration template by applying the filter generated in the filter generation unit to the image generated in the image generation unit, or for generating a verification image by applying the inverse filter to the image. With such a configuration, the biometric device transmits information including the generated registration template or verification image to the other equipment for performing biometric authentication.

Further the present invention preferably is a program executed by a biometric authentication system including terminal equipment and a server, which are connected via a network, to biometrically authenticate a user. In the terminal equipment, the program has a function for realizing the following steps of: image generation means for generating an image for registration or verification from collected biometric information of a user; filter generation means for generating a filter for scrambling the image and inverse filter thereof; transformation means for generating a registration template by applying the filter generated by the filter generation means to the image generated by the image generation means, or for generating a verification image by applying the inverse filter to the image; and means for transmitting information including at least the registration template or verification image, to the server. In the server, the program has a function for realizing the following steps of: registration means for storing the registration template transmitted and obtained from the terminal equipment into a memory; and verification means for verifying the verification image transmitted and obtained from the terminal equipment upon authentication against the registration template stored in the memory, and determining cross-correlation therebetween. With such a configuration, the program is executed on the terminal equipment and the server to authenticate the user according to the determination result by the verification means.

According to the present invention, it is possible to realize cancelable biometric authentication that can authenticate a user with an enrolled image and a verification image kept confidential to a server administrator by randomizing the images in a verification algorithm based on the cross-correlation between the images. It is also possible to realize cancelable biometric authentication in the case in which the images are three-value images and the verification algorithm uses distance values as verification values. Further, a random filter can be generated to make it more difficult to reproduce the original image from a randomized image.

BRIEF DESCRIPTION OF THE DRAWINGS

FIG. 11 is a flowchart showing a fingerprint authentication process in the second embodiment; and FIG. 12 is a flowchart showing details of the fingerprint registration and authentication processes in the second embodiment.

DETAILED DESCRIPTION OF THE PREFERRED EMBODIMENTS

Hereinafter, preferred embodiments of the present invention will be described with reference to accompanying drawings.

Embodiment 1

In the embodiment, a description will be given of an example of a cancelable finger vein authentication system that performs finger vein verification in a server while keeping finger vein images confidential to the server.

Figure 1:
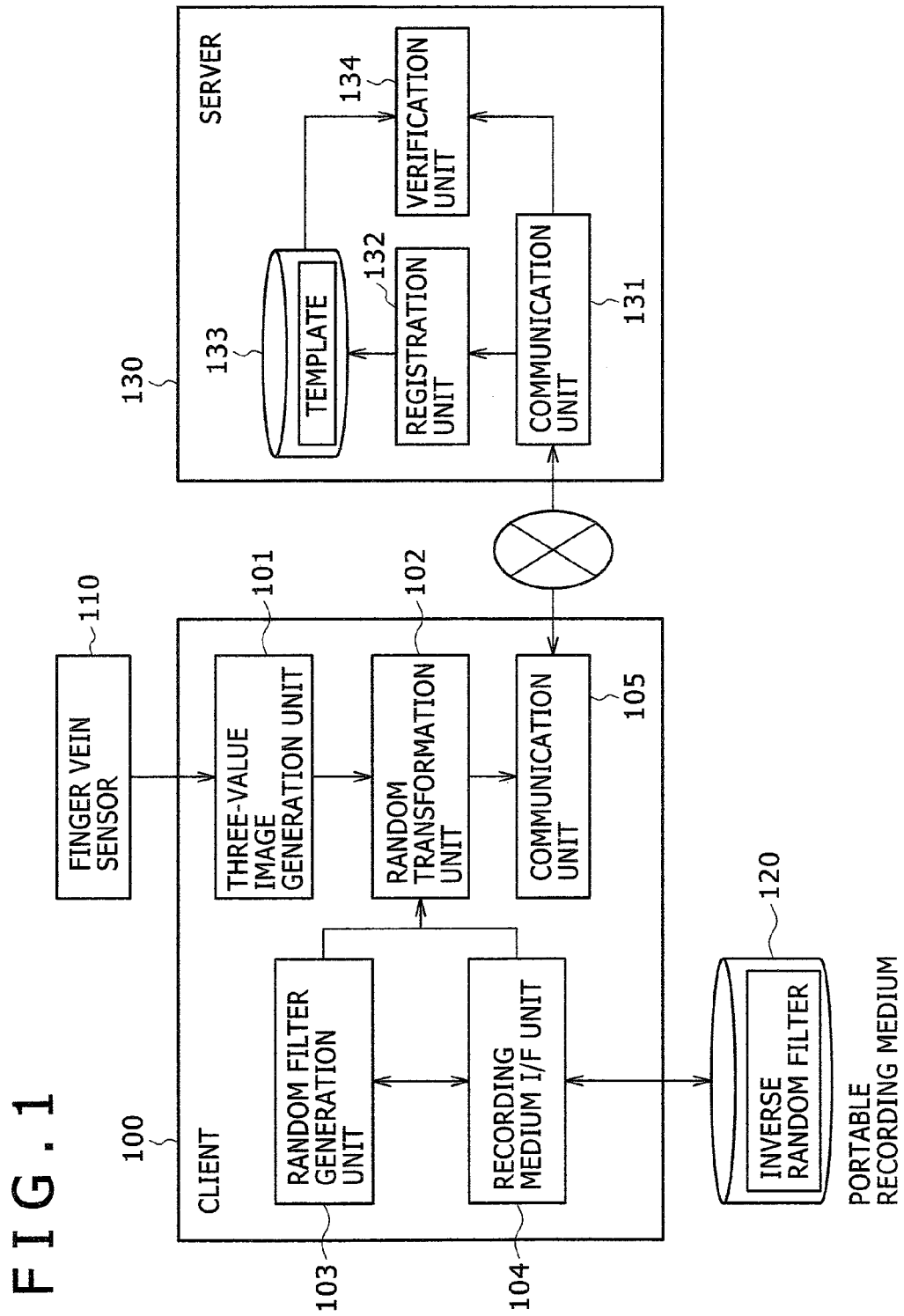
FIG. 1 is a diagram showing a configuration of a cancelable finger vein authentication system in a first embodiment.

FIG. 1 shows a configuration of a cancelable finger vein authentication system. This cancelable finger vein authentication system includes: a client terminal (hereinafter simply referred to as a client) 100 for obtaining a finger vein image upon registration and authentication, generating a three value image, and performing random transformation; and a server 130 for storing and verifying a template. The client 100 and the server 130 are connected via a network such as the internet or intranet.

The client 100 is managed by its user or a reliable third party, having a finger vein sensor 110 for imaging finger vein, and handling a portable recording medium 120. The portable recording medium 120 is a recording medium that the user carries and manages, such as IC card or USB memory. It is needless to say that other media, such as a portable terminal and a flexible disk, can also be used. For example, in the case of Internet banking from home, the client 100 may be a home personal computer managed by the user and the server 130 may be a server machine managed by a bank.

The client 100 includes: a three-value image generation unit 101 for extracting a finger vein pattern from a finger vein image and converting into three values; a random filter generation unit 103 for generating a random filter pair whose pixels have random values, respectively, upon registration; a random transformation unit 102 for transforming the three-value image by the random filter to generate a random image; a recording medium I/F unit 104 for communicating with the portable recording medium 120; and a communication unit 105 for communicating via a network. The processes of the three-value image generation unit 101, random filter generation unit 103, and random transformation unit 102 are realized by a processor of the client 100 executing a program. Incidentally, the three-value image generation can be realized, for example, by a method disclosed in JP-A No. 178606/2004.

The server 130 includes: a communication unit 131 for communicating via the network; a registration unit 132 for registering the random image as a template; a memory 133 for storing the template; and a verification unit 134 for calculating the mismatch rate by verifying a random image newly received upon authentication against the template. The processes in the registration unit 132 and the verification unit 134 are realized by the server 130 executing a program. Here, the mismatch rate is an index of how the target random image and the template are not similar. The images are similar to each other as the mismatch rate is smaller. Incidentally, the mismatch rate calculation can be realized, for example, by applying a method disclosed in Naoto Miura, Akio Nagasaka, Takafumi Miyatake, "Feature extraction of finger-vein patterns based on repeated line tracking and its application to personal identification", Machine Vision and Applications (2004) Vol. 15, p. 194-203.

Figure 2:
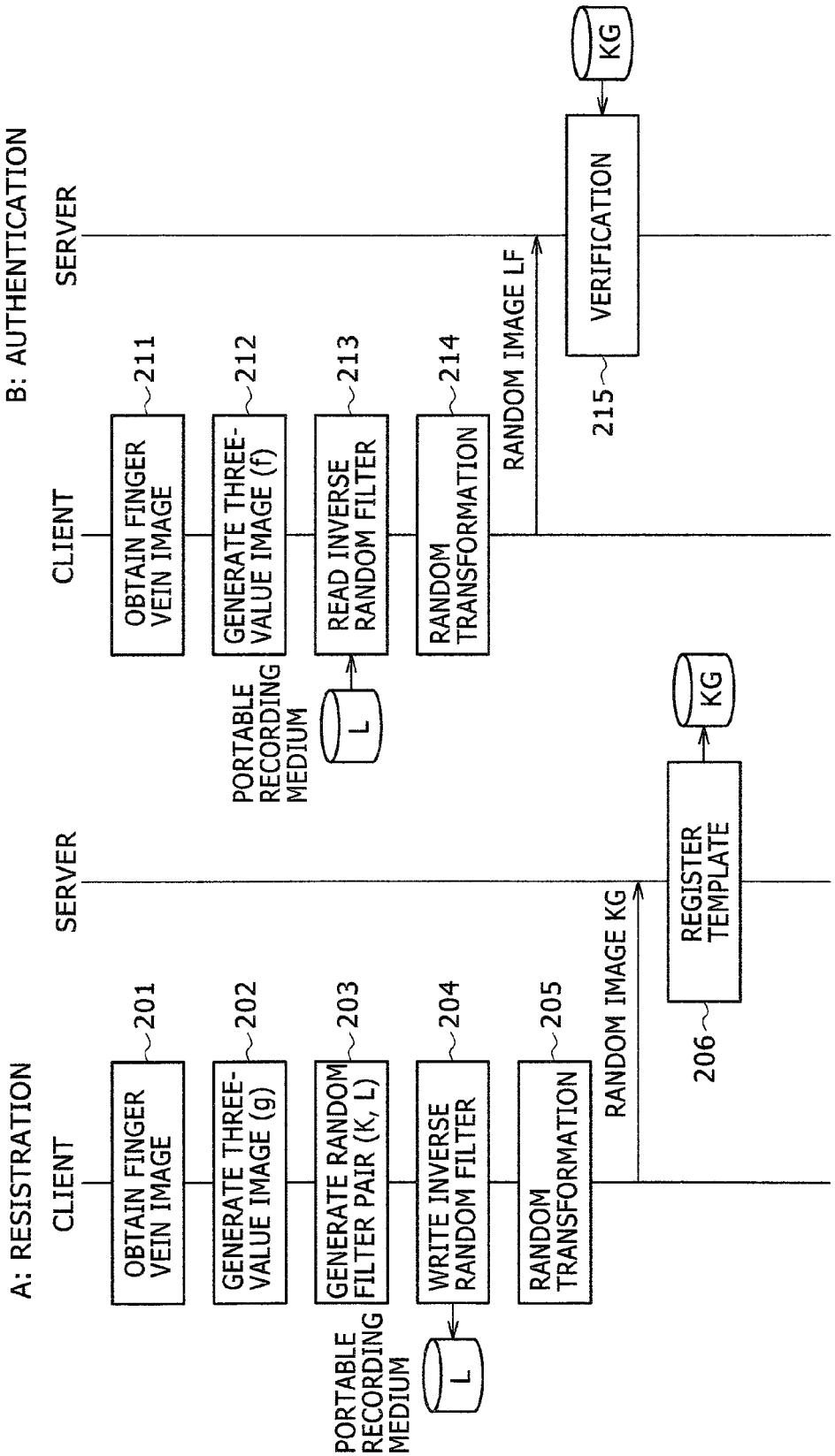
FIG. 2A is a flowchart showing a registration process of finger vein and FIG. 2B is a flowchart showing an authentication process thereof, in the first embodiment.

FIG. 2A shows an operation flow of a finger vein registration process, FIG. 2B shows an operation flow of a finger vein authentication process. First, a registration process operation will be described. In the client 100, the finger vein sensor 110 obtains a finger vein image of a user (S201). Then the client 100 extracts a finger vein pattern from the finger vein image, converts into three values, and generates a three-value image (S202).

Here, the three-value image generation can be realized, for example, by the method described in JP-A No. 178606/2004. According to the method, with a vertical width He and a horizontal width W for a three-value image g generated upon registration, and with a vertical width Hv and a horizontal width Wv for a three-value image f generated upon authentication, these widths are defined as He<Hv, We<Wv. However, in the embodiment of the present invention, the size of the three-value image g upon registration is enlarged to the size of the three-value image f upon authentication by the following method. First, the center of g is adjusted to the center of f, and then the luminance values of the pixels in an area outside g and inside f (namely, an area beyond g) are set to 1. In this way, the size of g can be enlarged to the vertical width Hv and the horizontal width Wv.

Next the client 100 generates a random filter pair (K, L) (S203). Here, K represents a random filter and L represents an inverse random filter. The client 100 writes the inverse random filter L into the portable recording medium 120, deleting the inverse random filter L from the memory in the client (S204). The inverse random filter L is stored in the portable recording medium 120 and is kept confidential to the server 130.

The client 100 inputs the random filter K and the three-value image g into the random transformation unit 102, and transmits an output random image KG to the server 130 (S205). The details of the random transformation will be described later. The server 130 receives the random image KG and registers the random image as a template to the memory 133 (S206).

Next, a process operation upon authentication will be described. The client 100 obtains a finger vein image of a user via the finger vein sensor 110 (S211). The client 100 generates a three-value image f from the finger vein image (S212). Here, the three-value image generation is performed, for example, by the method described in JP-A No. 178606/2004. The three-value image f has a size of the vertical width Hv and the horizontal width Wv.

Next the client 100 reads the inverse random filter L from the portable recording medium 120 (S213). Then the client 100 inputs the inverse random filter L and the three-value image f into the random transformation unit 102, and transmits an output random image LF to the server 130 (S214). The details of the random transformation will be described later.

The server 130 receives the random image LF and matches the random image LF against the template KG to determine whether the two finger veins are from the same person (S215).

The client 100 deletes the inverse random filter L from the memory therein after completion of the authentication process.

As described above, the server 130 stores the transformed random image KG as the template, and receives the transformed random image LF upon authentication. The random filter K and the inverse random filter L are kept confidential to the server 130, so that the original finger vein three-value images g and f can be unknown to the server 130. This ensures the confidentiality of the user to the server 130 and thus the privacy is protected. Even if the template KG is leaked from the server 130, the finger vein will not be forged as the original three-value image g is unknown. Further, it is possible to disable the old template by changing the random filter K and the inverse random filter L and updating the template, while using the same finger. This makes it possible to realize high safety and low template management cost in the server. Incidentally, in the embodiment, the inverse random filter L is stored in the recording medium carried by the user, but may be stored in the client 100 or may be dynamically generated from a password input by the user.

Figure 3:
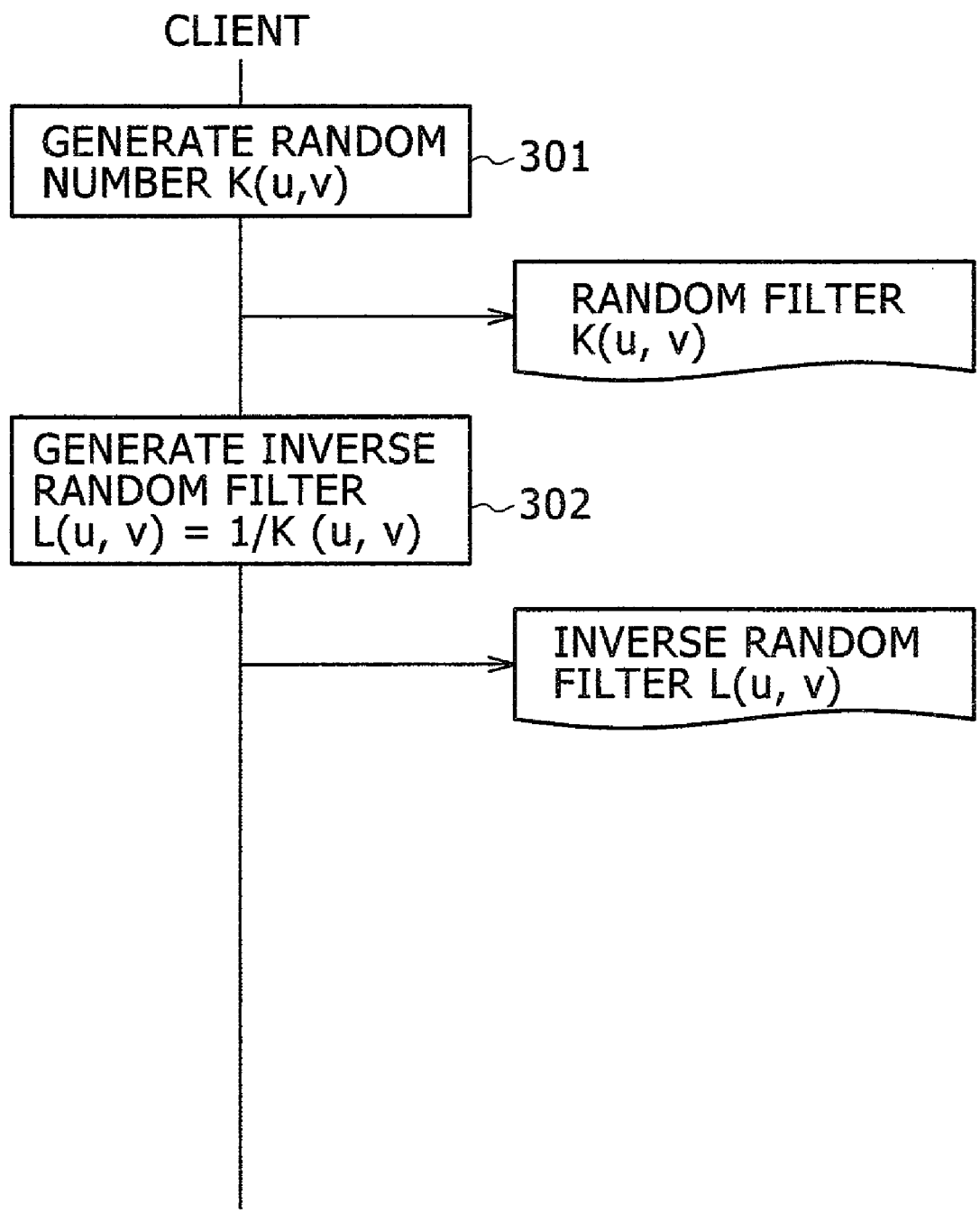
FIG. 3 is a flowchart showing a random transformation process in the first embodiment.

Next an operation of random filter pair generation will be described with reference to FIG. 3. Here, a description will be made on a method of generating the random filter pair (K, L) by the random filter generation unit 103 in the case of using Fourier transform as a basis transformation in the random transformation. In the method, the random filter K (u, v) is first set. With (u, v) for coordinates in a space after the basis transformation, a random value is generated for each (u, v) and is set to the value of K (u, v) (S301). Next, an inverse random filter L (u, v) is set. A reciprocal (or inverse for multiplication) of K (u, v) corresponding to each (u, v) is set to the value of L (u, v) (S302). Although binary images are generated in the random transformation as described below, a pair of random filters K' (u, v) and L' (u, v) for scrambling the binary images is separately generated using the same flow as above.

By use of the random filters K (u, v) and K' (u, v) generated as described above, images to be registered in the server as templates, K (u, v)·G (u, v) and K' (u, v)·G' (u, v), are scrambled. Thus even if K (u, v)·G (u, v), K' (u, v)·G' (u, v) are leaked from the server, it is difficult to reproduce G (u, v), G' (u, v), unless the random filters K (u, v), K' (u, v) are known. Similarly, images to be transmitted to the server upon authentication can also be scrambled by use of the inverse filters L (u, v) and L' (u, v) to generate L (u, v)·F (u, v), L' (u, v)·F' (u, v). In this way it is possible to make the finger vein verification cancelable.

As another example, the generation of the random filter pair (K, L) in the random filter generation unit 103 may be realized by the following method. In the method, K (u, v) and L (u, v) are set so that the random images K (u, v)·G (u, v) and L (u, v)·F (u, v), the outputs of the random transformation unit 102, have uniform random numbers.

Figure 4:
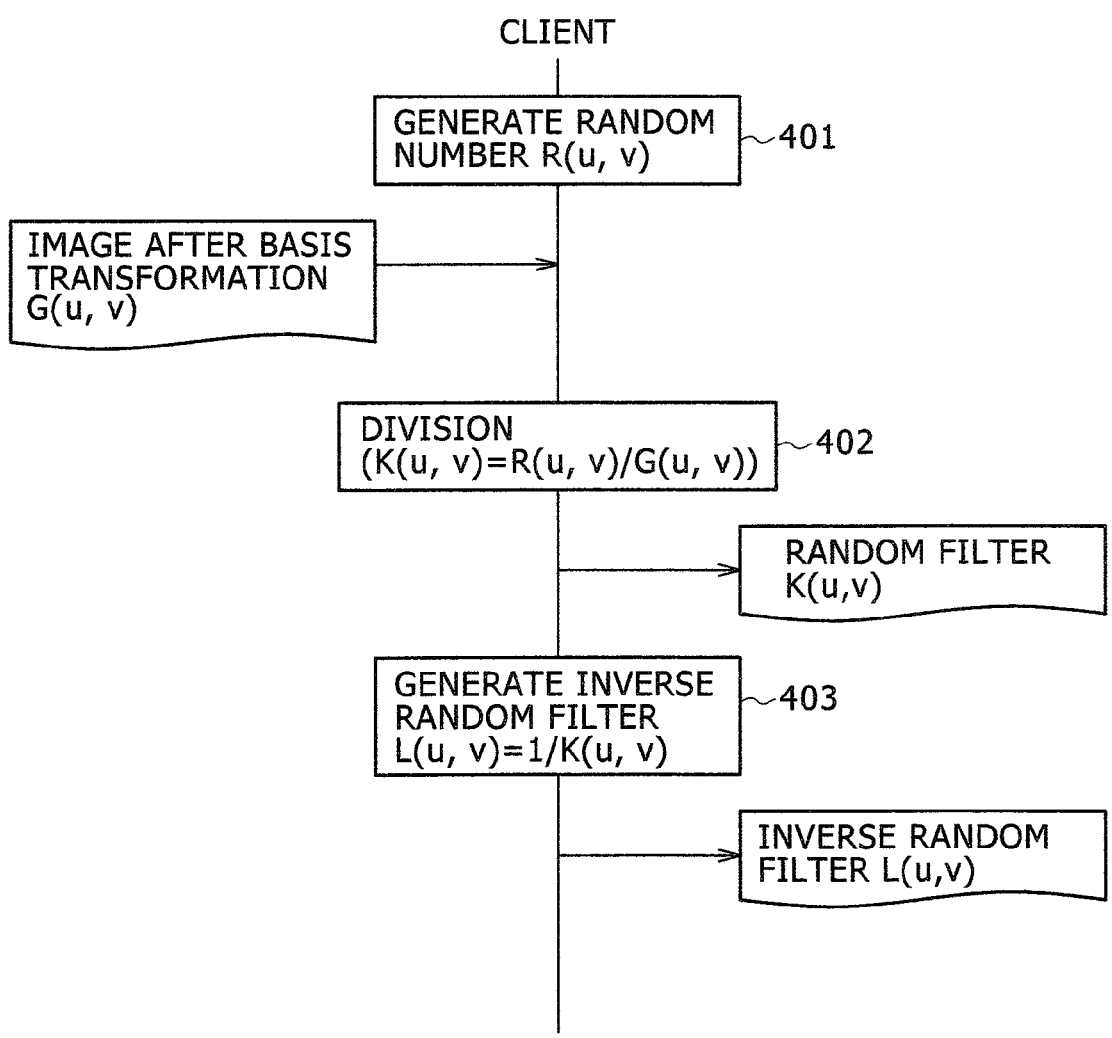
FIG. 4 is a flowchart showing a random transformation process according to another example.

Hereinafter the example will be described with reference to FIG. 4. First, the client 100 generates a uniform random number at each (u, v) (S401). Next, the client receives an image G (u, v), divides a random number R (u, v) by G (u, v), and sets this to the random filter K (u, v) (S402). Next the client calculates the inverse of K (u, v), and sets this to the inverse random filter L (u, v) (S403). By use of the random filter K (u, v) generated as described above, the random image K (u, v)·G (u, v) to be registered as a template to the server, is equal to R (u, v) and has a uniform random value. Even if K (u, v)·G (u, v) with the uniform random value is leaked from the server, it is difficult to determine the finger vein image and to reproduce G (u, v), unless the random filter K (u, v) is known. With the random filter pair generated by such a method, it is possible to make it more difficult to reproduce the random image K (u, v)·G (u, v) to be stored in the server. Similarly, the filters K' (u, v), L' (u, v) to be applied to the binary images G' (u, v), F' (u, v) can be set using the same flow as described above.

Figure 5:
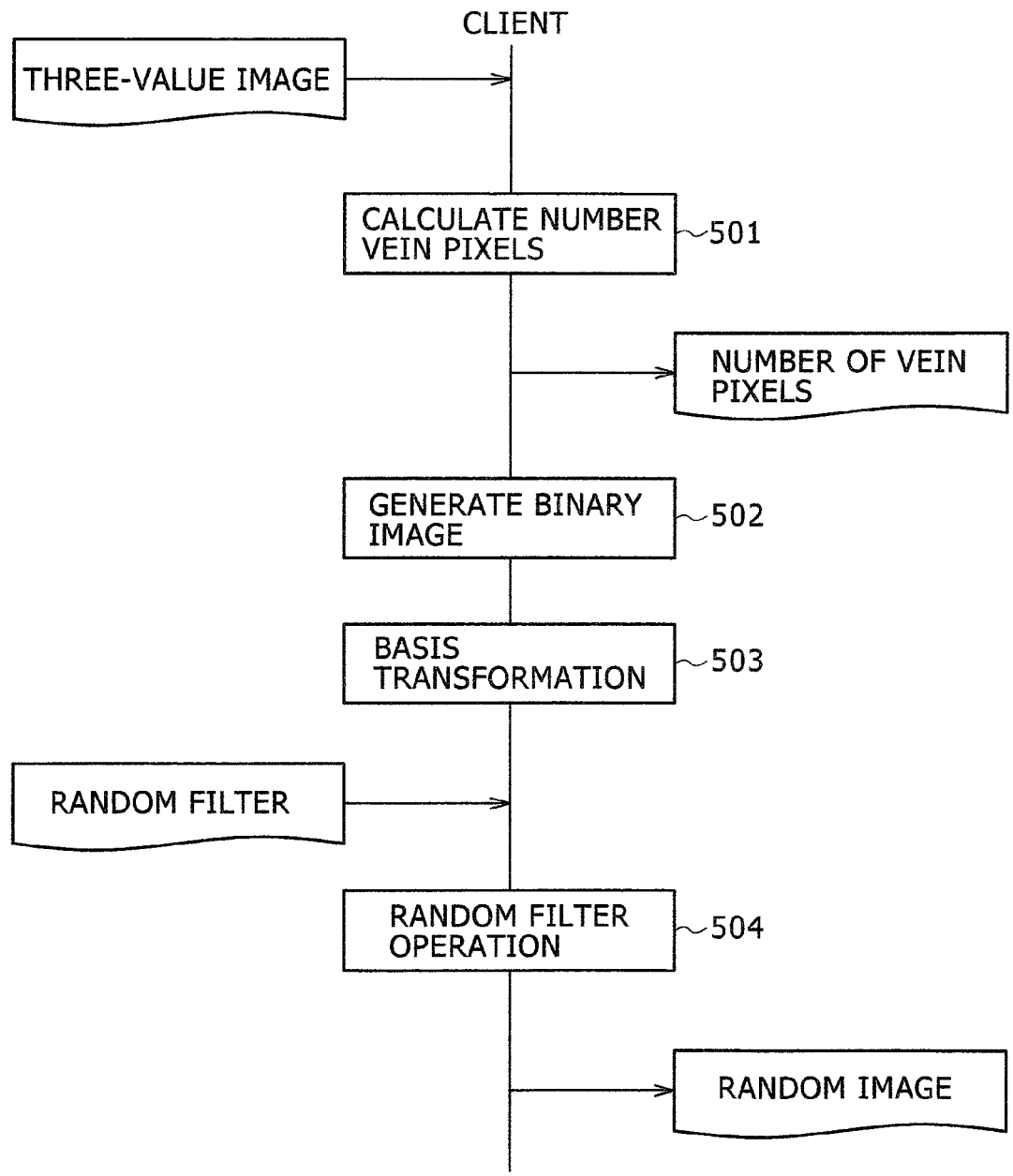
FIG. 5 is a flowchart showing a random transformation process according to another example.

Next, a process operation of random transformation will be described with reference to FIG. 5. The client 100 inputs the three-value image (g or f) to the random transformation unit 102. The random transformation unit 102 first calculates the number of vein pixels of the three-value image (S501). Upon registration, the random transformation unit 102 determines the sum of pixels with a luminance value of 2 on the three-value image g (x, y). This is denoted by Sg. Upon authentication, the random transformation unit 102 determines the sum of pixels with a luminance value of 2 on the three-value image f (x, y). This is denoted by Sf.

Next, the random transformation unit 102 generates a binary image from the three-value image (S502). In the binary image generation, when the pixels of the three-value image (g (x, y) or f (x, y)) have luminance values of 0 and 1, the values remain unchanged, and when the pixels have a luminance value of 2, the value is replaced by 0. Here, the generated binary images are denoted by g' (x, y) and f' (x, y).

Next, the random transformation unit 102 performs a basis transformation to the three-value image (g (x, y) or f (x, y)) and the binary image (g' (x, y) or f' (x, y)) (S503). Here, Fourier transform is taken as an example of the basis transformation. The image g (x, y) is transformed into a Fourier image G (u, v) by Fourier transform. The value of G (u, v) represents a space frequency element of g (x, y), where the frequency in the x direction is u and the frequency in the y direction is v. In the following description, Fourier image of g (x, y) is denoted by G (u, v), Fourier image of f (x, y) by F (u, v), Fourier image of g' (x, y) by G' (u, v), and Fourier image of f' (x, y) by F' (u, v), respectively. Incidentally a number theoretic transform may be used as the basis transformation, instead of the Fourier transform.

Next, the random transformation unit 102 performs a random filter calculation to the Fourier images by the random filters (S504). The random transformation unit 102 performs the operation to G and G' by the random filter K upon registration, and performs the calculation to F and F' by the inverse random filter L upon authentication. Here, K and L are similar to the Fourier images, having values for every combination of frequency u in the x direction and frequency v in the y direction, which can be represented by K (u, v), L (u, v), respectively. The values of K (u, v), L (u, v) are random numbers having a relationship of K (u, v)·L (u, v)=1. Now the content of the random filter calculation will be described. The random transformation unit 102 calculates K (u, v)·G (u, v) and K (u, v)·G' (u, v) upon registration, and calculates L (u, v)·F (u, v) and L (u, v)·F' (u, v) upon authentication. Hereinafter, the calculation results are referred to as random images. As described above, when K (u, v), L (u, v) are unknown, it is difficult to reproduce the original images G (u, v), F (u, v) from the random images, so that the finger vein three-value images can be kept confidential to the server 130.

Figure 6:
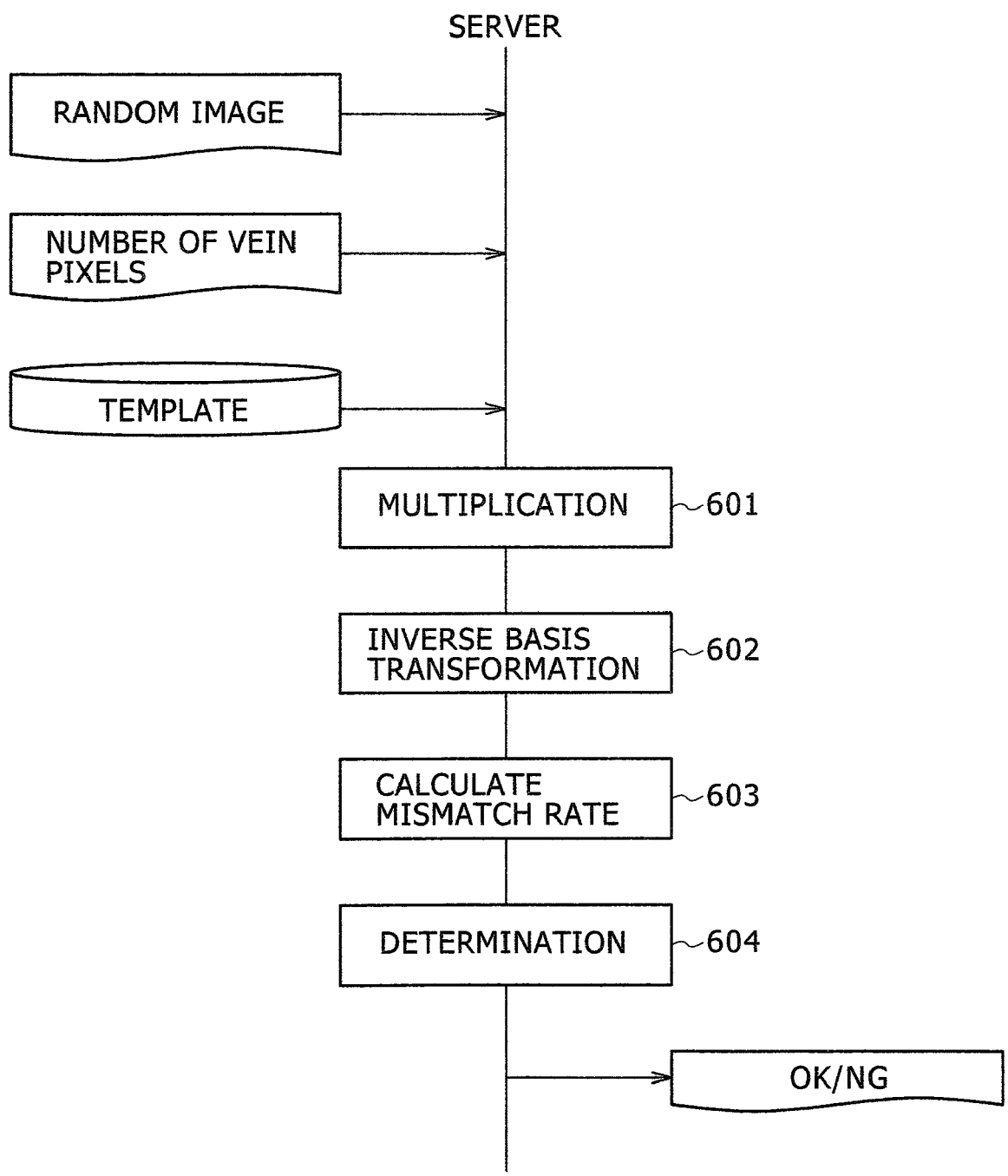
FIG. 6 is a flowchart showing details of a verification process in the first embodiment.

Next, a process operation of the verification unit 134 of the server 130 will be described with referent to FIG. 6. The server 130 inputs the random images L (u, v)·F (u, v), L (u, v)·F' (u, v) and the templates K (u, v)·G (u, v), K (u, v)·G' (u, v) into the verification unit 134. The verification unit 134 first calculates the product of L (u, v)·F (u, v) and K (u, v)·G (u, v) as well as the product of L (u, v)·F' (u, v) and K (u, v)·G' (u, v) (S601). The calculation results are denoted by W (u, v), W' (u, v) respectively.

Next, the verification unit 134 performs an inverse basis transformation to W (u, v), W' (u, v) (602). Here, inverse Fourier transform corresponding to the Fourier transform is taken as an example of the inverse basis transformation. The result of the inverse Fourier transform of W (u, v), w (p, q), represents the cross-correlation value obtained when g (x, y) is moved parallel to f (x, y) by (p, q). The result of the inverse Fourier transform of W' (u, v), w' (p, q), represents the cross-correlation value obtained when g' (x, y) is moved parallel to f' (x, y) by (p, q). Incidentally, in the case of using the number theoretic transform or any other transformation as the basis transformation instead of the Fourier transform, the corresponding inverse transformation is preferably used.

Next the verification unit 134 calculates a mismatch rate Rm (p, q) from w (p, q), w' (p, q), Sg, and Sf (S603). The mismatch rate Rm (p, q) is determined by dividing Sf+Sg−{w(p, q)−w' (p, q)}/2 by Sf+Sg. With (p, q) as a variable, the verification unit 134 calculates the minimum value of the mismatch rate Rm (p, q), compares this to a predetermined threshold, and identifies the user when the value is smaller than the threshold, while identifying another person when the value is larger than the threshold (S604).

Here, it should be noted that the verification is performed without reproducing the original three-value images or binary images from the random images K (u, v)·G (u, v), K (u, v)·G' (u, v), L (u, v)·F (u, v), and L (u, v)·F' (u, v). In other words, the authentication process can be performed with the finger vein three-value image or binary image kept confidential to the server 130. This makes it possible to realize the finger vein authentication of protection type of templates (here the three-value images or binary images of the finger vein). Incidentally, in the embodiment, although Sf and Sg are open to the server 130, it is difficult to reproduce the original three-value images from these parameters and thus there is no problem of confidentiality.

In the embodiment, the reproduction difficulty of the original three-value image may be enhanced according to the following method. This can be realized using the number theoretic transform as the basis transformation in the random unit 102 (S303). First, a description will be made on the outline of the number theoretic transform in the case of two dimensions. Given a two-dimensional data array d (x, y), the range of x and y is defined as $0 \leq x \leq N-1 0 \leq y \leq N-1$. There is a primitive N multiplication α of 1 that satisfies the following equation:

$$\alpha^N = 1 \pmod{M} \qquad \text{[Equation 1]}$$

where M is a certain integer.

The number theoretic transform to d (x) is defined by the following equation performed modulo the integer M:

$$D(u, v) = \sum_{x=0}^{N-1} \sum_{y=0}^{N-1} d(x, y) \alpha^{ux+vy} \quad (0 \leq u, v \leq N-1) \qquad \text{[Equation 2]}$$

The inverse transform is defined by the following equation:

$$d(x, y) = N^{-1} \cdot N^{-1} \sum_{u=0}^{N-1} \sum_{v=0}^{N-1} D(u, v) \alpha^{-(ux+vy)} (0 \leq x, y \leq N-1) \qquad \text{[Equation 3]}$$

In the embodiment, the two-dimensional number theoretic transform is applied to the three-value image (g (x, y) or f (x, y)) and the binary image (g' (x, y) or f' (x, y)). Then images Gn (u, v), G'n (u, v), Fn (u, v), and F'n (u, v) are generated after the transformation. Upon registration, the random filter K (u, v) used in the above random transformation is applied to Gn (u, v) and G'n (u, v), which involves performs modulo multiplication of the integer M. Further, an inverse Ln (u, v) modulo the integer M of K (u, v) is used as the value corresponding to the inverse random filter L (u, v). That is, K (u, v)·Ln (u, v)=1 (mod M) is established. Upon authentication, Ln (n, v) is applied to Fn (u, v), F'n (u, v).

Figure 7:
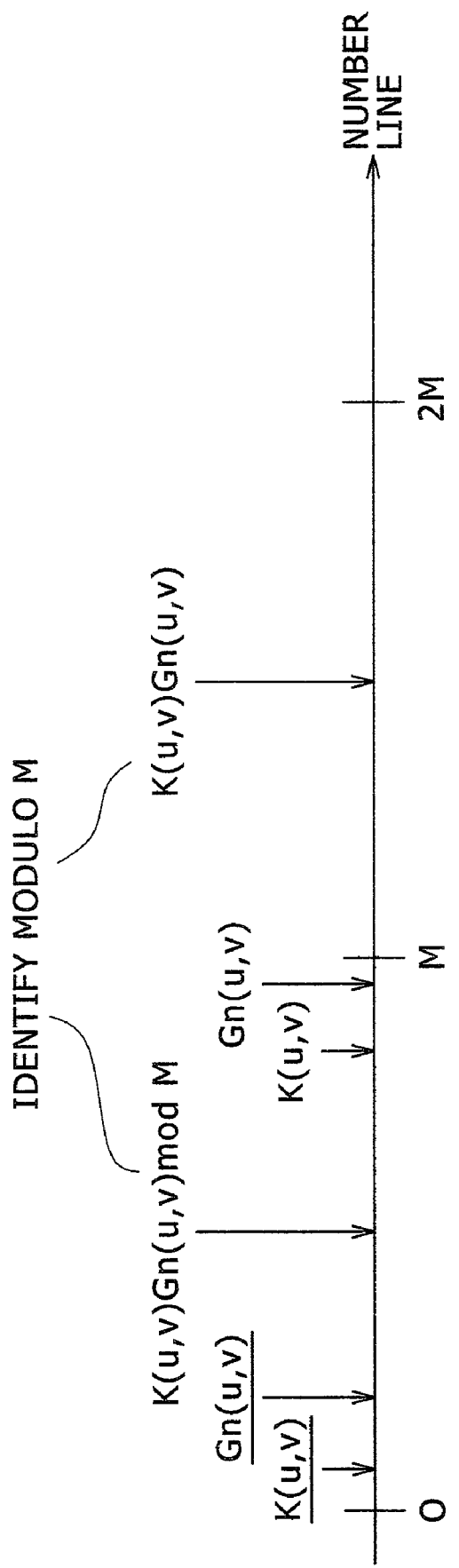
FIG. 7 is a diagram for illustrating the reason for enhancement of reproduction difficulty in the first embodiment.

Next, the reason why the reproduction difficulty is enhanced will be described with reference to FIG. 7. Here, K (n, v)·Gn (u, v) is taken up as an example. In the case of K (u, v)·Gn (u, v) already known, an attacker intends to find K (u, v) and Gn (u, v). The attacker calculates K (u, v)·Gn (u, v) modulo the integer M. When K (u, v)·Gn (u, v) obtained by the calculation as a simple integer is larger than M, as indicated on the number line in FIG. 7, this is seen to be identical to the remainder of the division by M. In this example, K (u, v)·Gn (u, v) is smaller than the respective values of K (u, v) and Gn (u, v). As a result, K (u, v) and Gn (u, v) smaller than K (u, v)·Gn (u, v) are candidates for K (u, v), Gn (u, v) that the attacker should know.

On the other hand, such candidates do not come up in the use of the Fourier transform. For the attacker, the amount of computational power needed for a brute force attack increases as the number of possible combinations of values increases. Thus, practically speaking, the reproduction difficulty is enhanced.

In order to prevent replay attacks or other risks due to leakage of the template from the server 130, it is preferable to update the template that has been made cancelable and is registered in the server 130, periodically or upon detection of leakage of the template. At this time, it is also desirable to reduce the burden to the user in such a way that the finger vein itself is not reregistered. An example of a template update method will be described below. In this example, the description will be made assuming that the Fourier transform is used as the basis transformation in the random transformation. However, it is applicable to another basis transformation such as the number theoretic transform.

Figure 8:
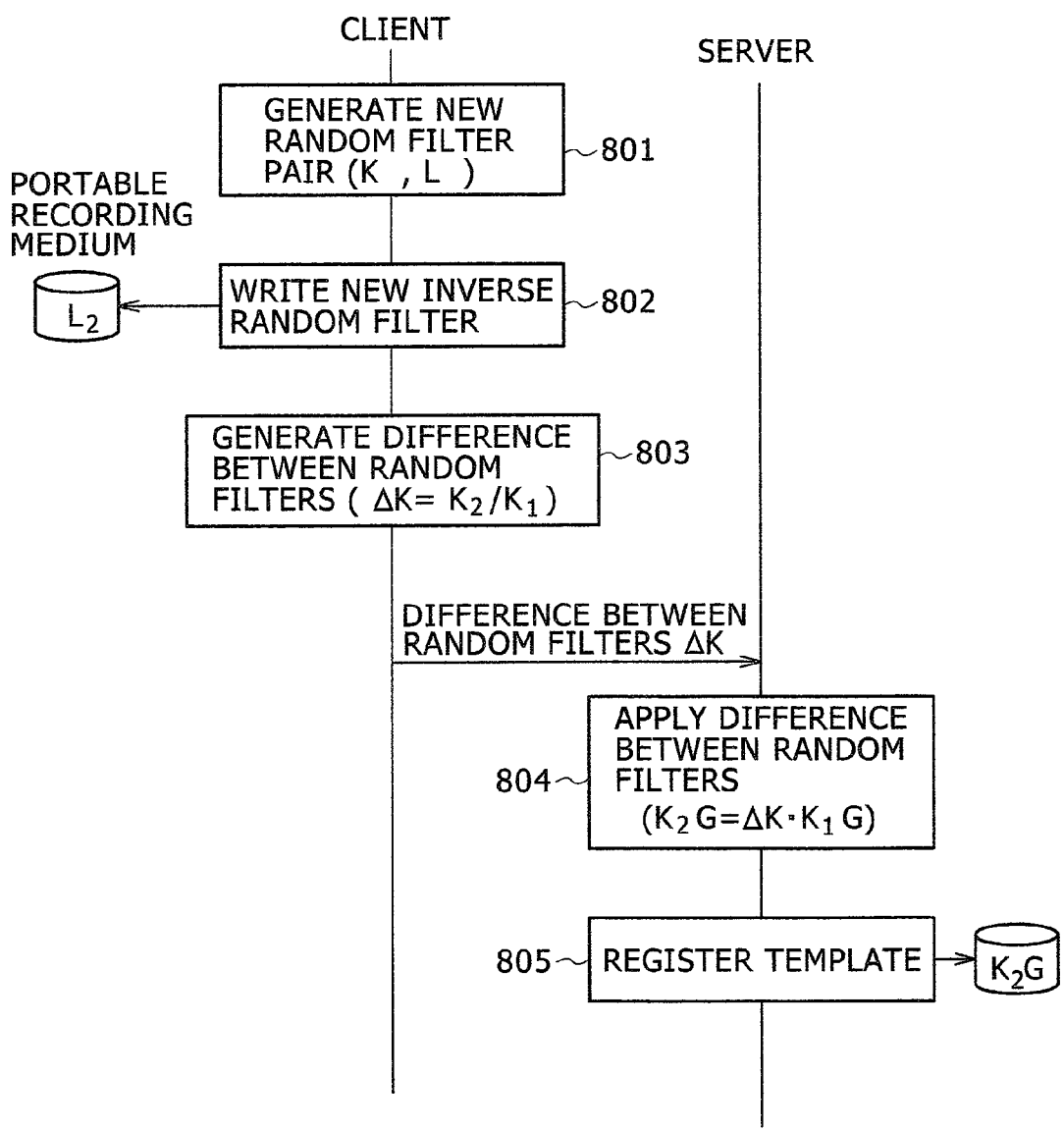
FIG. 8 is a flowchart showing a process of a template update method in the first embodiment.

FIG. 8 shows a process operation of a template update method. The client 100 newly generates a random filter pair (S801). Here, the existing random filter pair is represented by ($K_1$, $L_1$) and the new random filter pair is represented by ($K_2$, $L_2$). The generation method of the random filter pair preferably follows the above described example.

The client 100 writes the new inverse random filter $L_2$ into the portable recording medium in which the existing inverse random filter $L_1$ is overwritten (S802). Then the client 100 calculates $K_2/K_1$ and sets it to the random filter difference ΔK (S803). The server 130 receives the random filter difference ΔK from the client 100 and applies it to the existing template $K_1$G (S804). In other words, the server 130 calculates ΔK (u, v)·$K_1$ (u, v) G (u, v). This value is equal to $K_2$ (u, v) G (u, v) because ΔK (u, v)=$K_2$ (u, v)/$K_1$ (u, v). Next the server 130 registers $K_2$ (u, v) G (u, v) as a template, and updates the template (S805).

With the above described process, the template can be updated without leakage of the new and old random filters $K_1$, $K_2$ to the server 130 as well as without the need to reregister the finger vein itself. Thus it is possible to prevent replay attacks or other risks by updating the template having been made cancelable, while reducing the burden of reregistering the finger vein by the user.

According to the above described embodiment, the biometric authentication system registers and matches the biometric information in the server. However, the system is not limited to the above described example and can be applied to other situations. For example, it is applicable to information access control in corporate networks, identity verification in Internet banking systems or ATMs (Automated Teller Machines), login to members Web sites, and user authentication necessary for entering protected areas.

In this case, the same user would use plural systems and would register the biometric information to the respective systems. In such a case, preferably the filter and the inverse filter are applied by changing coefficients according to the target system. The coefficients are changed in this way, so that it is possible to protect the use of the same biometric information in other systems against leakage of the biometric information from a certain system.

Embodiment 2

Next, a second embodiment will be described with reference to FIGS. 9 to 12. The embodiment is a cancelable fingerprint authentication system for performing fingerprint verification within a server while keeping the fingerprint image confidential to the server.

Figure 9:
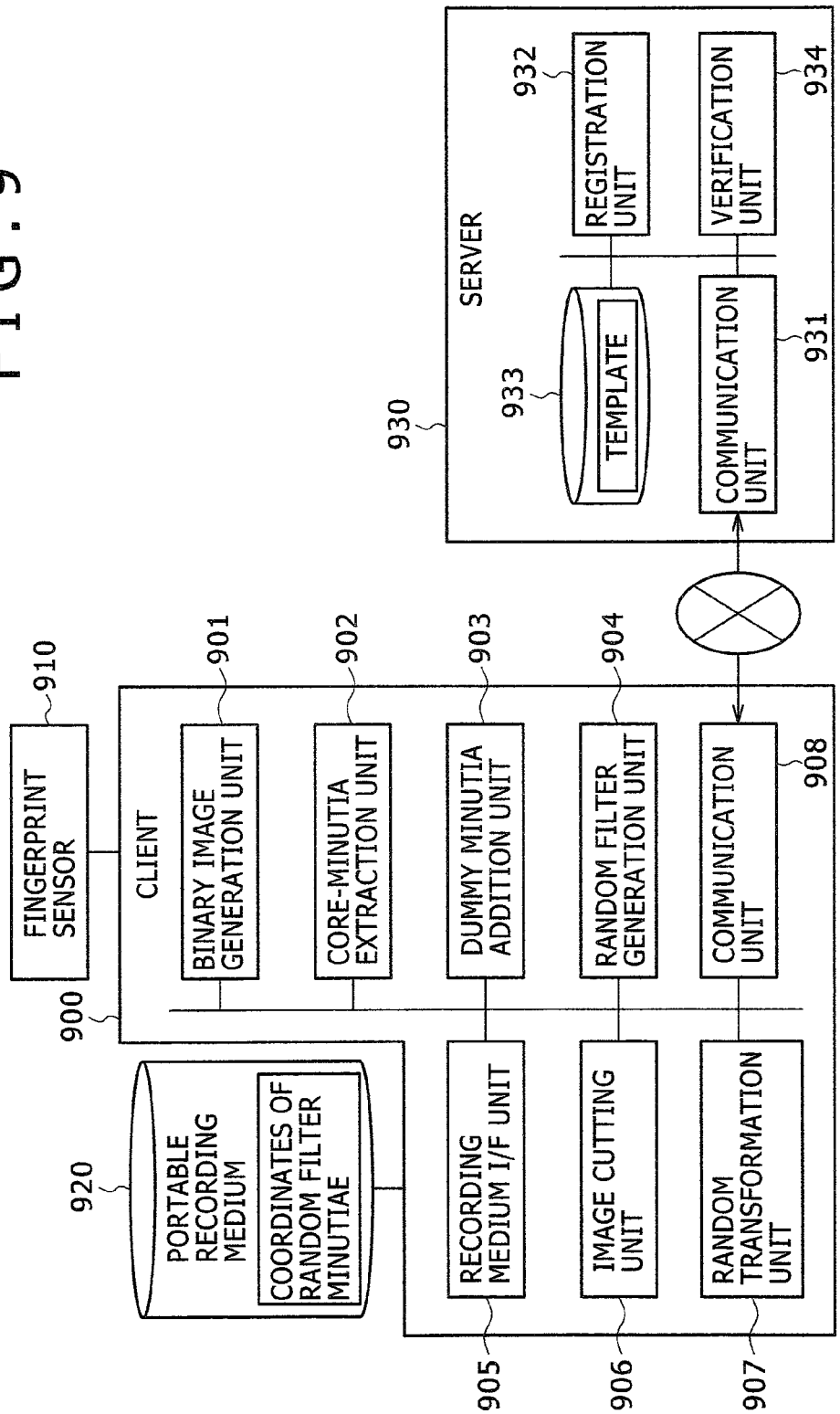
FIG. 9 is a diagram showing a configuration of a cancelable fingerprint authentication system in a second embodiment.

FIG. 9 shows a system configuration of cancelable fingerprint authentication. The cancelable fingerprint authentication system includes: a client terminal (hereinafter simply referred to as a client) 900 for obtaining a fingerprint image upon registration and authentication, generating a binary image, extracting a core and minutia, cutting out an image, and performing the random transformation; and a server 930 for storing and verifying a template. The client 900 and the server 930 are connected via a network such as the internet or intranet.

The client 900 is managed by its user or a reliable third party, having a fingerprint sensor 910 for imaging a fingerprint, and handling a portable recording medium 920 carried by the user. Similarly to the first embodiment, the portable recording medium 920 is a recording medium that the user carries and manages, such as IC card or USB memory. For example in the case of Internet banking from home, the client 900 may be a home personal computer managed by the user and the server 930 may be a server machine managed by a bank.

The client 900 includes: a binary image generation unit 901 for binarizing a fingerprint image; a core-minutia extracting unit 902 for detecting positions of a core (the center of the fingerprint whorl) and minutiae (a ridge ending and a ridge bifurcation) from the binary image; a dummy minutia generation unit 903 for randomly generating coordinates of dummy minutiae, in addition to the original minutiae coordinates; a random filter generation unit 904 for generating pairs of random filters for each of the minutiae (the original minutia and the dummy minutia); an image cutting unit 906 for cutting out chip images or peripheral images around each of the minutiae; a random transformation unit 907 for transforming the binary images to random images by the random filters applied to each of the chip images or peripheral images; a recording medium I/F unit 905 for performing communication with the portable recording medium 920; and a communication unit 908 for performing communication via a network. The processes of the binary image generation unit 901, core-minutia extracting unit 902, dummy minutia generation unit 903, random filter generation unit 904, image cutting unit 906, and random transformation unit 907 are realized by a processor of the client 900 executing a program. Incidentally, the binary image generation, core-minutia extraction, and image output can be realized, for example, by a method disclosed in JP-A No. 344213/2001 (US 20020150283, EP 1313026).

The server 930 includes: a communication unit 931 for performing communication via the network; a registration unit 932 for registering the random images as templates; a memory 933 for storing the templates; and a verification unit 934 for calculating degree of similarity by verifying random images newly received upon authentication against the templates. The processes in the registration unit 932 and the verification unit 934 are realized by the server 930 executing a program.

Here, the degree of similarity is the number of matched images determined when plural chip images cut out upon registration are compared to plural peripheral images cut out upon verification, respectively. It is shown that the registered fingerprint and the verified fingerprint are similar as the degree of similarity is large. The match or mismatch between the chip image and the peripheral image is determined based on the number of pixels matched when the two images are overlapped. However, the positions of the minutiae may be displaced due to influences such as deformation and rotation upon registration and verification. Thus the size of the peripheral image is made larger than the size of the chip image. The chip image is moved parallel on the peripheral image to find a location where the number of matched pixels is the maximum value. The match/mismatch is determined based on the maximum value. This feature will be understood in more detail by the description of JP-A No. 344213/2001 (US 20020150283, EP 1313026).

Figure 10:
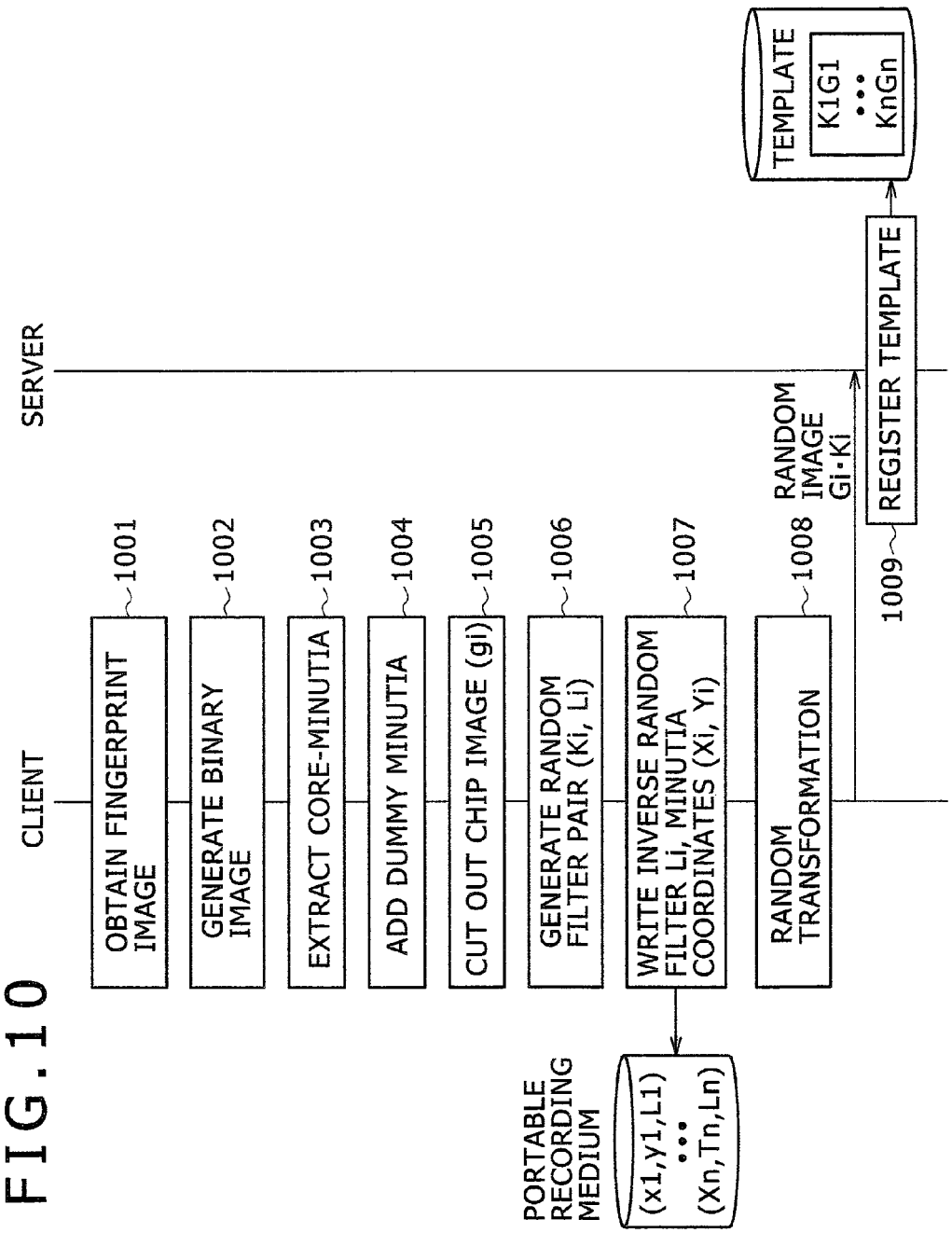
FIG. 10 is a flowchart showing a fingerprint registration process in the second embodiment.

Next, an operation of a fingerprint registration process according to the embodiment will be described with reference to FIGS. 10 and 12. First, the client 900 obtains a fingerprint image of a user (S1001). Next, the client 900 binarizes the obtained fingerprint image and generates a binary image for registration 1200 (S1002). Here, the value of each pixel is −1 (white) or 1 (black). Next, the client 900 extracts the positions of the core and minutiae, and calculates the coordinates of each minutia with the core position as the original point (0, 0) (S1003). In addition to the extracted minutiae, the client 900 generates plural sets of random coordinates as dummy minutiae (S1004). Hereinafter, the original minutiae and the dummy minutiae are collectively referred to as minutiae. Next, the client 900 cuts out a chip image 1201 (gi) of a predetermined size (w×w pixels), around each minutia coordinates (Xi, Yi) (i=1, ..., n) from the binary image for registration (S1005).

Next, the client 900 generates a random filter pair (Ki, Li) for the each minutia (S1006). Here, Ki is referred to as a random filter, Li as an inverse random filter. The client 900 sets the size of the random filter Ki to W×W pixels (W≧w) and randomly generates pixel values in a similar way to the first embodiment. Further, the client 900 provides the inverse of the pixel value of Ki for the inverse random filter Li. Then the client 900 writes a set of minutia coordinates and inverse random filter 1204 (Xi, Yi, Li) (i=1, ..., n) into the portable recording medium 920 (S1007).

Next, the client 900 transforms the each chip image 1201 (gi) by the random filter Ki to generate a random image. More specifically, the client 900 pads the periphery of the chip image 1201 (gi) with 0 (grey) to expand to W×W pixels, to which the basis transformation (number theoretic transform or Fourier transform) is applied. An image 1202 (W×W pixels) after the basis transformation is denoted by Gi. The client 900 generates a random image 1205 (Gi·Ki) by crossing the random filter Ki to Gi for each pixel. This is performed for the each chip image gi (i=1, ..., n). The client 900 transmits the generated random image Gi·Ki (i=1, ..., n) to the server 930 (S1008). The server 930 receives the random image Gi·Ki and registers as a template (S1009).

Next, an operation of a fingerprint authentication process according to the embodiment will be described with reference to FIGS. 11 and 12. First, the client 900 obtains a fingerprint image of a user (S1101). Next, the client 900 binarizes the obtained fingerprint image and generates a binary image for verification 1210 (S1102). Here, the value of each pixel is −1 (white) or 1 (black). Next, the client 900 reads the each set of minutia coordinates and inverse random filter 1204 (Xi, Yi, Li) (i=1, . . . , n) from the portable recording medium 920 (S1103). Next, the client 900 cuts out a peripheral image 1211 (fi) around the each minutia coordinates (Xi, Yi) from the binary image for verification (S1104). The size of the peripheral image is set to W×W pixels. Next, the client 900 generates a random image 1214 (Fi·Li) by crossing the inverse random filter Li to an image 1212 (Fi) generated after application of the basis transformation (number theoretic transform or Fourier transform) to the peripheral image fi, for each pixel. This is performed for the each peripheral image fi (i= 1, . . . , n). The client 900 transmits the generated random image Fi·Li (i=1, . . . , n) to the server 930 (S1105).

The server 930 matches the received random image Fi·Li against the each random image Gi·Ki in the template, and determines the match/mismatch between the chip image 1201 (gi) and the peripheral image 1211 (fi). More specifically, the server 930 crosses the two random images for each pixel. As the pixel values of Li are the inverses of the pixel values of Ki, they are offset when being crossed with each other, and are expressed by (Fi·Li)·(Gi·Ki)=Fi·Gi. The server applies the inverse basis transformation (inverse number theoretic transform or inverse Fourier transform) to obtain a correlation image 1215 between fi and gi. The pixel value at coordinates (ΔX, ΔY) on the correlation image indicates the correlation value obtained when the chip image gi is overlapped and moved parallel by (ΔX, ΔY) on the peripheral image fi. As the pixel values of the binary image are −1 (white) and 1 (black), the following equation is given:

> Correlation value=(Number of matched white and black pixels)−(Number of mismatched white and black pixels)=2×(Number of matched white and black pixels)−W×W Thus it is possible to determine the match/mismatch between the binary images fi and gi by comparing the maximum value of the pixel value (correlation value) on the correlation image, to a predetermined threshold. In this way, the server 930 determines the match/mismatch for each pair of chip image and peripheral image, and counts the number of matched images to represent the degree of similarity (S1106). Finally the server 930 compares the degree of similarity to a predetermined authentication threshold. When it is larger than the authentication threshold, the server 930 determines that the fingerprint is matched. When it is smaller than the authentication threshold, the server 930 determines that the fingerprint is not matched (S1107).

As described above, according to the fingerprint authentication of the embodiment, the chip image and peripheral image of the fingerprint are scrambled by the random filter and the inverse random filter, and then are transmitted to the server. Thus the correlation value can be calculated while the original image is unknown to the server. This allows the user to receive the fingerprint authentication with the fingerprint kept confidential to the server. Incidentally, like in the first embodiment, there would be a method of transforming and verifying the entire fingerprint image. However, unlike the case of the finger vein, deformation can easily occur in the fingerprint image, and sufficient authentication accuracy may not be obtained by verification based on the correlation between the entire images. On the other hand, by determining the match/mismatch between the images seen locally, it is possible to reduce the influence of deformation. Particularly this is suitable for the fingerprint identification as the periphery of the fingerprint minutia (ridge ending or ridge bifurcation) has a special structure.

In the embodiment, it is necessary to record the coordinates of minutiae. The coordinates of minutiae are in themselves the important information to identify the fingerprint, or kind of fingerprint information. If the coordinates of minutiae are leaked from the client, there is a possibility that the leaked coordinates may be a clue to forge the fingerprint. Hence in the embodiment, it is possible to eliminate such a risk by adding dummy minutiae. The chip image of a dummy minutia is very likely to be identical not only to the user's fingerprint but also to another person's fingerprint. This means the number of matched chips (degree of similarity) increases both for the user and another person when compared to the case of using only the original chip images. However when the authentication threshold is appropriately increased as much as the increased number of matched chips, the accuracy will not be degraded.

Incidentally the present invention is not limited to the above described embodiments, and various modifications can be made. For example, in the example of FIG. 1, the user's biometric information is obtained from the finger vein sensor 110, and the processes including the generation of images for registration and verification are performed in the client 100. However, according to a variation, the biometric device may be configured such that the functions 101 to 105 within the client 100 shown in FIG. 1 are integrally formed with the finger vein sensor 110. With the biometric device of this configuration, the user can carry the biometric device and collect the user's biometric information at an arbitrary time and place to use for personal authentication. Incidentally, the present invention is not limited to the authentication using finger vein and fingerprint described in the embodiments. It goes without saying that the present invention can be applied to the authentication using palm print and other biometric information.

What is claimed is:

1. A biometric authentication method for authenticating a user based on cross-correlation between an enrolled image and a verification image of biometric information of a user, the method comprising the steps of:

generating a random filter for scrambling the enrolled image and an inverse filter of the random filter;

generating a registration template by scrambling the enrolled image by applying the random filter to the enrolled image generated from the biometric information; and storing the registration template into a memory, and during authentication, applying the inverse filter to the verification image generated from the biometric information obtained from the user; and verifying the identity of the user based on cross-correlation between the registration template and an image generated by applying the inverse filter to the verification image.

2. The biometric authentication method according to claim 1, further comprising the steps of:

during registration of the biometric information, applying Fourier transform to the enrolled image; and applying the random filter, on a frequency space, and during authentication, applying the Fourier transform to the verification image; and applying the inverse filter on the frequency space.

3. The biometric authentication method according to claim 1, further comprising:
during registration, applying number theoretic transform to the enrolled image; and
applying the random filter, on a space after the number theoretic transform, and
during authentication, applying the number theoretic transform to the verification image; and applying the inverse filter on the space after the number theoretic transform.

4. The biometric authentication method according to claim 1, wherein the random filter and the inverse filter thereof are set so that the registration template, which is generated by applying the random filter, and the image generated by applying the inverse filter to the verification image have random values.

5. The biometric authentication method according to claim 1,
wherein the enrolled image and the verification image are three-value images having three types of luminance values 0, 1, and 2,
the method comprising the steps of:
during registration, changing the pixel luminance value of 2 to 0 in the enrolled image; generating a binary image with two types of luminance values 0, 1, as a registration binary image; and applying the random filter to scramble the enrolled image and the registration binary image, respectively, as registration templates,
during authentication, changing the pixel luminance value of 2 to 0 in the verification image; generating a binary image with two types of luminance values 0, 1, as a verification binary image; and applying the inverse filter to the verification image and the verification binary image, respectively, and
verifying the identity of the user by calculating a distance value, using the cross-correlation between the enrolled image of the registration templates and the verification image as well as the cross-correlation between the registration binary image and the verification binary image.

6. The biometric authentication method according to claim 1, wherein the generated inverse filter is stored to a recording medium carried by the user or to a memory in a terminal equipment.

7. The biometric authentication method according to claim 1, wherein the random filter and the inverse filter are used by changing coefficients according to a target to which the biometric authentication method is applied.

8. A biometric authentication system for biometrically authenticating a user by terminal equipment and a server, which are connected via a network,
the terminal equipment including:
an image generation unit that generates an image for registration and an image for verification, from collected biometric information of the user;
a filter generation unit that generates a random filter for scrambling any image for registration and an inverse filter of the random filter;
a transformation unit that generates a registration template by scrambling the image for registration by applying the random filter generated in the filter generation unit to the image for registration generated in the image generation unit and generates a filtered verification image by applying the inverse filter to the image for verification; and
a first communication unit that transmits the registration template and the filtered verification image, to the server,
wherein the server including:
a second communication unit that receives information transmitted from the terminal equipment;
a registration unit that stores the registration template received via the second communication unit into a memory; and
a verification unit that matches the filtered verification image obtained via the second communication unit during authentication against the registration template stored in the memory, and calculates cross-correlation between the filtered verification image and the registration templates,
thereby to verify the identity of the user according to a calculation result of the verification unit.

9. The biometric authentication system according to claim 8,
wherein, when the registration template is updated, the terminal equipment newly generates and stores a random filter and an inverse filter of the random filter, obtains a difference between the existing random filter and the new random filter, and transmits the difference to the server, and
the server generates a new registration template by applying the received difference to the registration template having been registered, and registers the new registration template into the memory.

10. The biometric authentication system according to claim 8,
wherein, during registration of the registration template, the terminal equipment applies the Fourier transform to the image for registration, and applies the random filter, on a frequency space, and
during authentication, the terminal equipment applies the Fourier transform to the image for verification, and applies the inverse filter on the frequency space.

11. The biometric authentication system according to claim 8, wherein the random filter and the inverse filter thereof are set so that the registration template, which is generated by applying the filter, and the filtered verification image, which is generated by applying the random inverse filter, have random values.

12. The biometric authentication system according to claim 8, wherein the random filter and the inverse filter are used by changing coefficients according to a system to which the biometric authentication system is applied.

13. Terminal equipment coupled to a server for biometrically authenticating a user based on cross-correlation between an enrolled image and a verification image of biometric information of the user, the terminal equipment comprising:
a biometric data collection unit that collects biometric information;
an image generation unit that generates the enrolled image and the verification image from the collected biometric information of the user;
a filter generation unit that generates a random filter for scrambling the enrolled image and an inverse filter of the random filter;
a transformation unit that generates a registration template by scrambling the enrolled image by applying the random filter generated in the filter generation unit to the enrolled image generated in the image generation unit, and generates a filtered verification image by applying the inverse filter to the verification image; and
a communication unit that transmits the registration template and the filtered verification image to the server, thereby the server performs biometric authentication by using the registration template and the filtered verification image.

14. A biometric device coupled to other equipment for biometrically authenticating a user based on cross-correlation between an enrolled image and a verification image of biometric information of the user, the biometric device comprising:
- a sensor that collects biometric information from a user;
- an image generation unit that generates the enrolled image and the verification image from the collected biometric information of the user;
- a filter generation unit that generates a random filter for scrambling the enrolled image and an inverse filter of the random filter; and
- a transformation unit that generates a registration template by scrambling the enrolled image by applying the random filter generated in the filter generation unit to the enrolled image generated in the image generation unit, and generates a filtered verification image by applying the inverse filter to the verification image,
- thereby the other equipment performs biometric authentication by using the registration template and the filtered verification image.

15. The biometric device according to claim 14,
wherein, during registration of the biometric information, the biometric device applies the Fourier transform to the enrolled image, and applies the random filter, on a frequency space, and
during authentication, the biometric device applies the Fourier transform to the verification image, and applies the inverse filter on the frequency space.

16. A non-transitory computer-readable medium embodying a program to be executed by a biometric authentication system including terminal equipment and a server, which are connected via a network, the program comprising:
- an image generating step of generating an image for registration and an image for verification from collected biometric information of a user, in the terminal equipment;
- a filter generating step of generating a random filter for scrambling any image for registration and an inverse filter of the random filter, in the terminal equipment;
- a transforming step of generating a registration template by scrambling the image for registration by applying the random filter generated in the filter generating step to the image for registration generated in the image generating step and for generating a filtered verification image by applying the inverse filter to the image, in the terminal equipment;
- a step of transmitting the registration template and the filtered verification image to the server, in the terminal equipment;
- a registering step of storing the registration template transmitted and obtained from the terminal equipment into a memory in the server; and
- a verifying step of verifying the filtered verification image transmitted and obtained from the terminal equipment during authentication against the registration template stored in the memory to calculate cross-correlation between the filtered verification image and the registration templates, in the server,
thereby to perform authentication according to a calculation result of the verifying step.

17. The biometric authentication method according to claim 1, further comprising the steps of:
- selecting coordinates at one or more locations on the enrolled image;
- cutting out a local image of a predetermined size around each of the coordinates;
- determining a match or mismatch relative to the local image by cross-relation or a distance between an enlarged image at the coordinates and the local image, on the verification image; and
- verifying the identity of the user based on a number of matched local images.

18. The biometric authentication method according to claim 17, wherein the coordinates selected on the enrolled image are the coordinates of a point having a characteristic structure in the enrolled image.

19. The biometric authentication method according to claim 17, wherein the coordinates selected on the enrolled image are the coordinates of a point having a characteristic structure and the coordinates of a point randomly selected in the enrolled image.

20. The biometric authentication method according to claim 18,
wherein the biometric information is a fingerprint,
the point having the characteristic structure is a fingerprint ridge ending or bifurcation, and
the coordinates are calculated with the core of the fingerprint as an original point.

21. The biometric authentication method according to claim 1, wherein the biometric information is a finger vein.

22. A biometric authentication system for biometrically authenticating a user by terminal equipment and a server, which are connected via a network,
the terminal equipment including:
- an image generation unit that generates an image for registration and an image for verification, from collected biometric information of the user;
- a local image cutting unit that selects coordinates at one or more locations on the image, and cuts out a local image of a predetermined size around each of the coordinates;
- a filter generation unit that generates a random filter for scrambling any image for registration and an inverse filter of the random filter;
- a transformation unit that generates a registration template by scrambling the image for registration by applying respective random filters generated in the filter generation unit to respective local images for registration generated in the local image cutting unit, and generates a local image for filtered verification by applying respective inverse filters to respective images for verification; and
- a first communication unit that transmits the registration template and the filtered verification local image, to the server,
wherein the server including:
- a second communication unit that receives information transmitted from the terminal equipment;
- a registration unit that stores the registration template received via the second communication unit into a memory;
- a local image verification unit that matches the filtered verification local image obtained via the second communication unit against the registration template stored in the memory, to determine a match or mismatch by cross-relation between the filtered verification image and the registration templates; and
- a determination unit that determines the match or mismatch of the biometric information based on the number of the matched local images, thereby to authenticate the user according to a determination result of the determination unit.

23. The biometric authentication system according to claim 22, wherein, when the registration template is updated, the terminal equipment newly generates and stores a random filter and an inverse filter of the random filter for respective coordinates, obtains a difference between respective existing random filters and respective new random filters, and transmits the difference to the server and, the server generates a new registration template by applying respective received differences to respective registration templates having been registered, and stores the new registration template to the memory.

24. The biometric authentication system according to claim 22, wherein, during registration of the registration template, the terminal equipment applies the Fourier transform to the respective local images cut out from the image for registration, and applies the random filter, on a frequency space, and during authentication, the terminal equipment applies the Fourier transform to the respective local images cut out from the image for verification, and applies the inverse filter on the frequency space.

25. The biometric authentication system according to claim 22, wherein, during registration of the registration template, the terminal equipment applies the number theoretic transform to the respective local images cut out from the image for registration, and applies the random filter after the number theoretic transform, and during authentication, the terminal equipment applies the number theoretic transform to the respective local images cut out from the image for verification, and applies the inverse filter to the image after the number theoretic transform.

26. The biometric authentication system according to claim 22, wherein the random filter and the inverse filter thereof are set so that the registration template, which is generated by applying the random filter, and the filtered verification image, which is generated by applying the inverse filter, have random values.

27. The non-transitory computer-readable medium according to claim 16, with the program further comprising the steps of:

selecting coordinates at one or more locations on the enrolled image;

cutting out a local image of a predetermined size around each of the coordinates;

determining a match or mismatch relative to the local image by cross-relation or a distance between an enlarged image at the coordinates and the local image, on the verification image; and verifying the identity of the user based on a number of matched local images.

28. A biometric authentication system for biometrically authenticating a user, comprising:

an image generation unit that generates an image for registration or verification from the collected biometric information of the user;

a filter generation unit that generates a random filter for scrambling an image for registration and an inverse filter of the random filter;

a transformation unit that generates a registration template by scrambling the image for registration by applying the random filter generated in the filter generation unit to the image for registration generated in the image generation unit, and generates a filtered verification image by applying the inverse filter to the image for verification;

a registration unit that stores the registration template into a memory; and a verification unit that matches the filtered verification image obtained during authentication against the registration template stored in the memory, and calculates cross-relation between the filtered verification image and the registration templates, thereby to authenticate the user according to a calculation result of the verification unit.

* * * * *